Nov. 30, 1948.  B. R. HALL  2,455,119
COLLAPSIBLE GOCART
Filed April 4, 1947  2 Sheets-Sheet 1

INVENTOR.
BERTIE R. HALL
BY
Bruce & Brosler
HIS ATTORNEYS

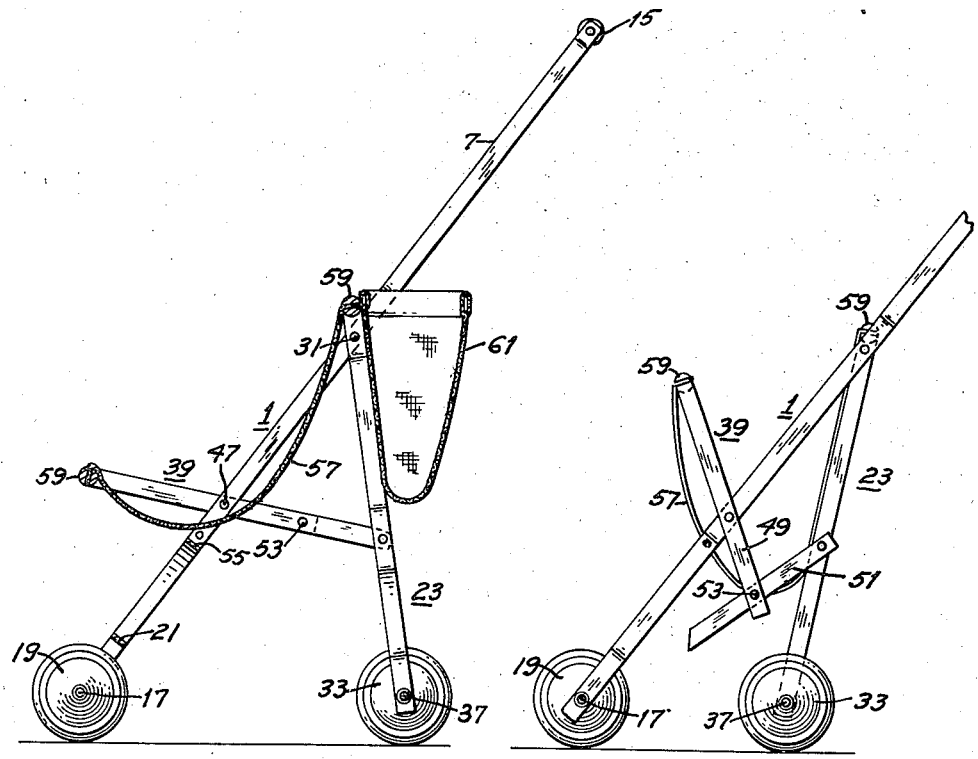

Patented Nov. 30, 1948

2,455,119

UNITED STATES PATENT OFFICE 2,455,119

COLLAPSIBLE GOCART

Bertie R. Hall, El Cerrito, Calif.

Application April 4, 1947, Serial No. 739,310

5 Claims. (Cl. 280—41)

My invention relates to collapsible carts and more particularly to one of the type conventionally referred to as a go-cart.

Among the objects of my invention are:

(1) To provide a novel and improved go-cart of the collapsible type;

(2) To provide a novel and improved go-cart of extreme simplicity of design and requiring a minimum amount of riveting in the fabrication thereof;

(3) To provide a novel and improved go-cart which may be readily opened or collapsed, and with a minimum of effort;

(4) To provide a novel and improved go-cart of collapsible type which may be manufactured very economically.

Additional objects of my invention will be brought out in the following description of a preferred embodiment of the same taken in conjunction with the accompanying drawings wherein—

Figure 3 is a side elevational view taken in section through the go-cart of Figure 1;

Figure 4 is a corresponding view showing the cart in a partly-collapsed condition, but without the shopping bag attachment.

Figures 1, 2:
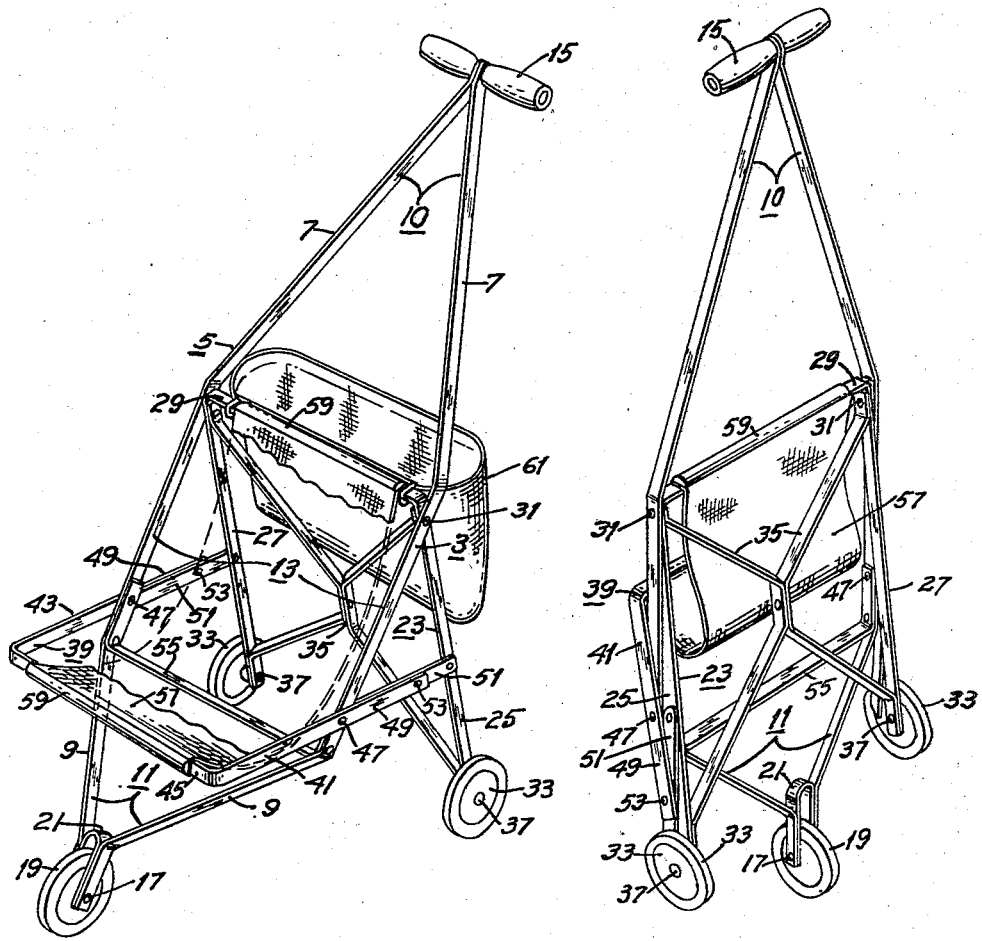
Figure 1 is a three-dimensional view of my invention in its opened condition, as viewed from the front.
Figure 2 is a three-dimensional view of the go-cart of Figure 1 in its folded or collapsed condition, as viewed from the rear.

Referring to the drawings for a more detailed description of my invention in its preferred form, the go-cart includes a main frame 1 formed of a pair of strips 3 and 5 of metal, each strip having upper and lower end portions 7 and 9 respectively angularly directed toward corresponding end portions of the other strip to form, when assembled, a frame having an upper tapered section 10, a lower tapered section 11 and an intermediate section 13 of rectangular form.

At the upper end of the upper tapered section of the main frame, the frame members are bent back to parallelism and drilled to provide an anchorage for a handle 15, while at the lower end of the frame, the frame members are similarly bent back to parallelism and drilled to receive a short axle 17 on which to mount a front wheel 19.

A yoke 21 is interposed between and riveted to the lower parallel end portions of the frame members and similarly drilled for such wheel axle, such yoke serving to rigidify the wheel support.

The cart includes a rear frame 23, formed of the same type of strip metal. Such frame comprises a pair of parallel side members 25 and 27 connected at one end by a cross member 29, and is hingedly secured adjacent its corners, as by rivets 31, between the intermediate portions of the main frame members at points adjacent the upper tapered section of the main frame.

This rear frame is adapted to mount a pair of wheels 33, one at the lower end of each side member of the frame, and is rigidified by an X brace 35, the upper ends of which are secured by the same rivets 31, which hinge the rear frame to the main frame.

The X brace is designed so that its lower ends terminate alongside the lower ends of the rear frame side members whereby both ends may be drilled to provide solid double thickness supports for the rear wheel axles 37 at those points.

A seat frame 39 is provided, which is preferably formed of strip metal like the main and rear frames, such seat frame including a pair of parallel side members 41 and 43, adjoined by an interconnecting or cross member 45. This seat frame is adapted to straddle the main frame at about seat level, with its side members 41 and 43 intersecting the main frame members 3 and 5 respectively. At the points of intersection the seat frame is hingedly secured to the main frame as by rivets 47. This leaves portions 49 of the side members of the seat frame projecting beyond the main frame toward the rear frame.

A side brace member 51 is pivotally secured to a rear frame side member at an intermediate point thereon, each such side brace member being of a length to extend to and engage a side member of the main frame when the main frame and rear frame are spread to an angle representing the opened condition of the go-cart. The end of each side brace member is preferably trimmed off on a bias to provide a more secure engagement with the main frame side member under such conditions.

With the free end of the brace members in positive engagement with the main frame members, the seat frame is riveted adjacent each end to the side brace members, as by rivets 53. By locating such rivets a short distance from the free ends of the seat frame side members, there will be less tendency for side-sway or lateral displacement of the side brace members thereby assuring a more secure pressure contact by the side brace members against the main frame members in the open condition of the cart. The aforementioned construction thus provides a foldable hinge of utmost simplicity and ruggedness.

The main frame is preferably braced by a cross member 55 joining the lower ends of the intermediate rectangular section of the main frame. By bringing the ends of this cross member up alongside the frame members to points above the intersections between the main frame and the seat frame, and utilizing the seat hinge rivets as a means of securing this cross member, a double thickness of metal will be provided at the region where the side brace members engage the main frame members, thereby further assuring secure pressure engagement for the side brace members in the open condition of the cart.

The entire frame thus described, has been reduced to its simplest form without sacrificing strength and rigidity. The absence of any toggle hinges, permits the hinge to fold readily in applying an upward pull on the seat frame to collapse the cart.

The number of rivets required in the assembling of the entire frame has been reduced to a minimum, thus effecting considerable saving in labor.

A strip 57 of canvas or other suitable material when slung between the cross member 29 of the rear frame and the corresponding cross member 45 of the seat frame furnishes a seat and backrest for a child to be transported in the cart. In hanging such strip of material, each end is wrapped at least once about its associated supporting cross member and held thereon by a strip 59 of wood or other material fastened to each side of the supporting member as by screws passing through the supporting member and engaging both of said strips.

The length of the fastening strips is such as to leave a short stretch of the cross member exposed at each end to provide for the hanging of a market or shopping bag 61 which is designed to be conveniently hooked over the cross member 29 of the rear frame, with its center of gravity supported substantially in line with the rear wheels so that there will be no tendency for the cart to tip backwards in the absence of a child occupying the seat.

From the above description of my improved go-cart, it will be apparent that it fulfills all the objects of my invention as previously recited, and while I have disclosed a preferred embodiment of my invention in considerable detail, I do not desire to be limited to such details in my protection except as may be necessitated by the appended claims.

I claim:

1. A collapsible go-cart comprising a main frame; a rear frame; means pivotally securing said rear frame to said main frame at an intermediate location on said main frame to permit angular separation between the two frames; a pair of side brace members, each pivotally secured to a side of said rear frame and extending to and engaging said main frame at the desired angular separation of the two frames; a substantially horizontal frame including a pair of side members joined at one end by a cross member, said substantially horizontal frame being disposed with its side members intersecting said main frame; means pivotally securing each side member of said substantially horizontal frame at an intermediate point thereof to said main frame; and means hingedly securing the free end of each such substantially horizontal frame side member to the adjacent one of said side brace members at an intermediate point thereon.

2. A collapsible go-cart comprising a main frame; a rear frame; means pivotally securing said rear frame to said main frame at an intermediate location on said main frame to permit angular separation between the two frames; a pair of side brace members, each pivotally secured to a side of said rear frame and extending to and engaging said main frame at the desired angular separation of the two frames; a substantially horizontal frame including a pair of side members joined at one end by a cross member, said substantially horizontal frame being disposed with its side members intersecting said main frame; means pivotally securing each side member of said substantially horizontal frame at an intermediate point thereof to said main frame; means hingedly securing the free end of each such substantially horizontal frame side member to the adjacent one of said side brace members at an intermediate point thereon; a seat for a child in said go-cart, and means supporting said seat below the points of intersection of said substantially horizontal frame with said main frame.

3. A collapsible go-cart comprising a main frame, said frame including a pair of strips of metal, end portions of each being angularly bent toward corresponding end portions of the other to form a frame having an upper tapered section, a lower tapered section, and an intermediate rectangular section, said strips terminating in parallel ends, a yoke disposed between and affixed to such parallel ends; a wheel mounted within said yoke; a handle at the upper end of said main frame; a rear frame of substantially rectangular shape having a pair of wheels at one end and a cross member at its other end; means pivotally securing said rear frame to said main frame at approximately the upper end of said intermediate section to permit angular separation between the two frames; and foldable hinge means connecting said main and rear frames below said pivotal securing means to limit the permissible angular spread of said frames.

4. A collapsible go-cart comprising a main frame, said frame including a pair of strips of metal, an end portion of each being angularly bent toward the corresponding end portion of the other to form a frame having a lower tapered section, said strips terminating in lower parallel ends, a yoke disposed between and affixed to such parallel ends; a wheel mounted within said yoke; a handle at the upper end of said main frame; a rear frame having a pair of wheels at one end and a cross member at its other end; means pivotally securing said rear frame adjacent its upper end to said main frame at an intermediate location on said main frame to permit angular separation between the two frames; a pair of side brace members, each pivotally secured to a side of said rear frame and extending to and engaging said main frame at the desired angular separation of the two frames; a seat frame including a pair of side members joined at one end by a cross member, said seat frame being disposed with its side members intersecting said main frame strips; means pivotally securing said seat frame to said main frame at said points of intersection; means hingedly securing the free end of each such seat frame side member to the adjacent one of said side brace members at an intermediate point thereon; and a seat supported between the rear frame cross member and said seat frame cross member.

5. A collapsible go-cart comprising a main frame, said frame including a pair of strips of metal, end portions of each being angularly bent toward corresponding end portions of the other to form a frame having a lower tapered section, and an intermediate rectangular section, said strips terminating in parallel ends, a yoke disposed between and affixed to such parallel ends; a wheel mounted within said yoke; a handle at the upper end of said main frame; a rear frame of substantially rectangular shape having a pair of wheels at one end and a cross member at its other end; means pivotally securing said rear frame to said main frame at approximately the upper end of said intermediate section to permit angular separation between the two frames; a pair of side brace members, each pivotally secured to a side of said rear frame and extending to and engaging said main frame at the desired angular separation of the two frames; a seat frame including a pair of side members joined at one end by a cross member, said seat frame being disposed with its side members intersecting said main frame at approximately the lower end of said main frame intermediate section; means pivotally securing each seat frame side member at an intermediate point thereof to said main frame; means hingedly securing the free end of each such seat frame side member to the adjacent one of said side brace members at an intermediate point thereon; and a seat supported between rear frame cross member and said seat frame cross member.

BERTIE R. HALL.

REFERENCES CITED

The following references are of record in the file of this patent:

UNITED STATES PATENTS

| Number | Name | Date |
|---|---|---|
| 1,979,563 | Morgan | Nov. 6, 1934 |